United States Patent [19]
Holly

[11] 3,964,127
[45] June 22, 1976

[54] MOLDING APPARATUS
[75] Inventor: Harry H. Holly, Olympia Fields, Ill.
[73] Assignee: Hollymatic Corporation, Park Forest, Ill.
[22] Filed: Dec. 30, 1974
[21] Appl. No.: 537,400

[52] U.S. Cl. .................................................. 17/32
[51] Int. Cl.² .......................................... A22C 7/00
[58] Field of Search ....................... 17/32; 425/812

[56] References Cited
UNITED STATES PATENTS

| | | | |
|---|---|---|---|
| 2,814,921 | 12/1957 | Beerend | 17/32 |
| 3,386,129 | 6/1968 | Holly | 17/32 |
| 3,731,345 | 5/1973 | Brackman | 17/32 |

Primary Examiner—Warner H. Camp
Attorney, Agent, or Firm—Wegner, Stellman, McCord, Wiles & Wood

[57] ABSTRACT

An apparatus and method for shaping an article from moldable material and particularly a food article as from ground raw meat, fish and the like to produce firmly packed articles with relatively low power requirements while avoiding the entrapment of extraneous air in the article. The apparatus and method also include seals for sealing the mold and mold opening against substantial loss of liquid components during the molding. The material is pressure fed into a mold opening provided with an air vent means and the entering charge of material vents the air from the mold opening and then the material itself operates a valve to close the air vent against substantial losses of even liquid components of the moldable material.

15 Claims, 11 Drawing Figures

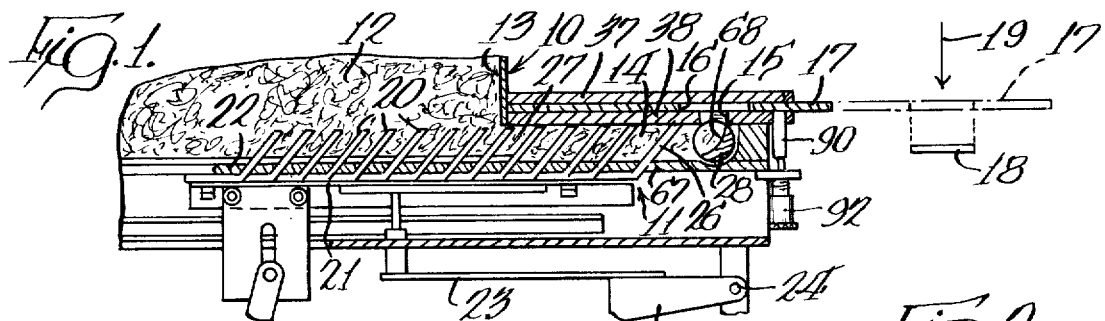
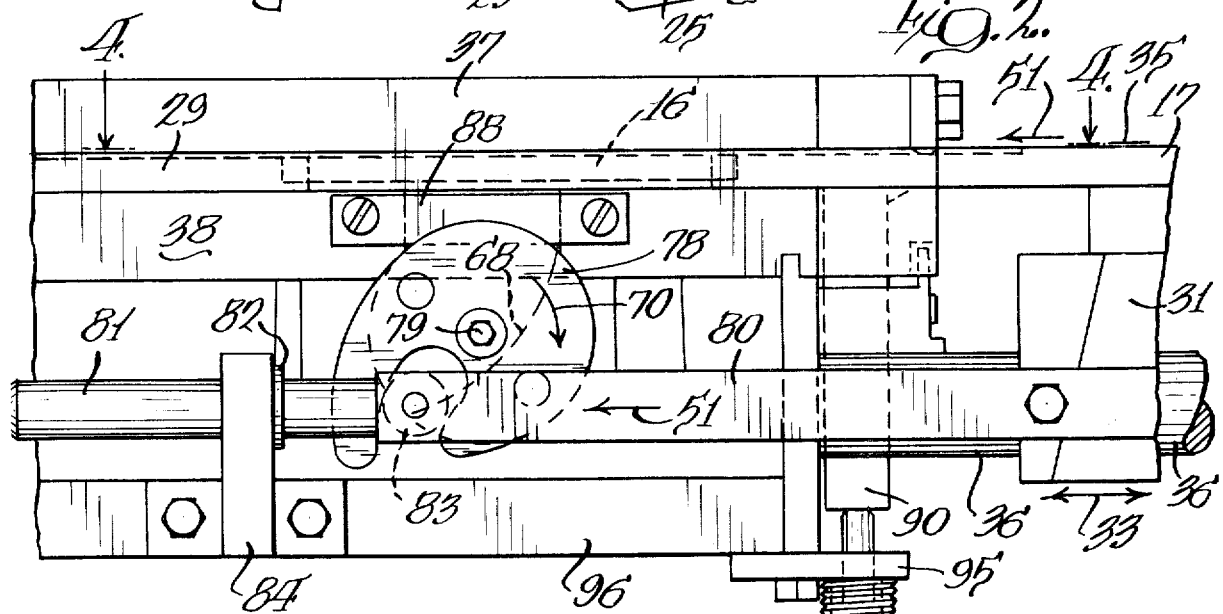
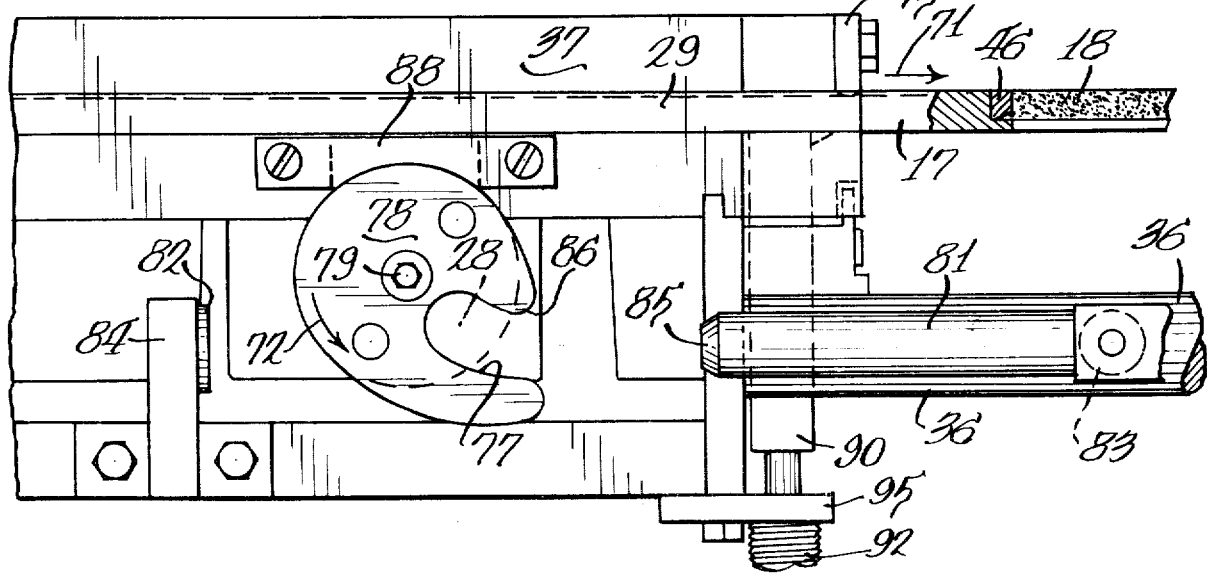

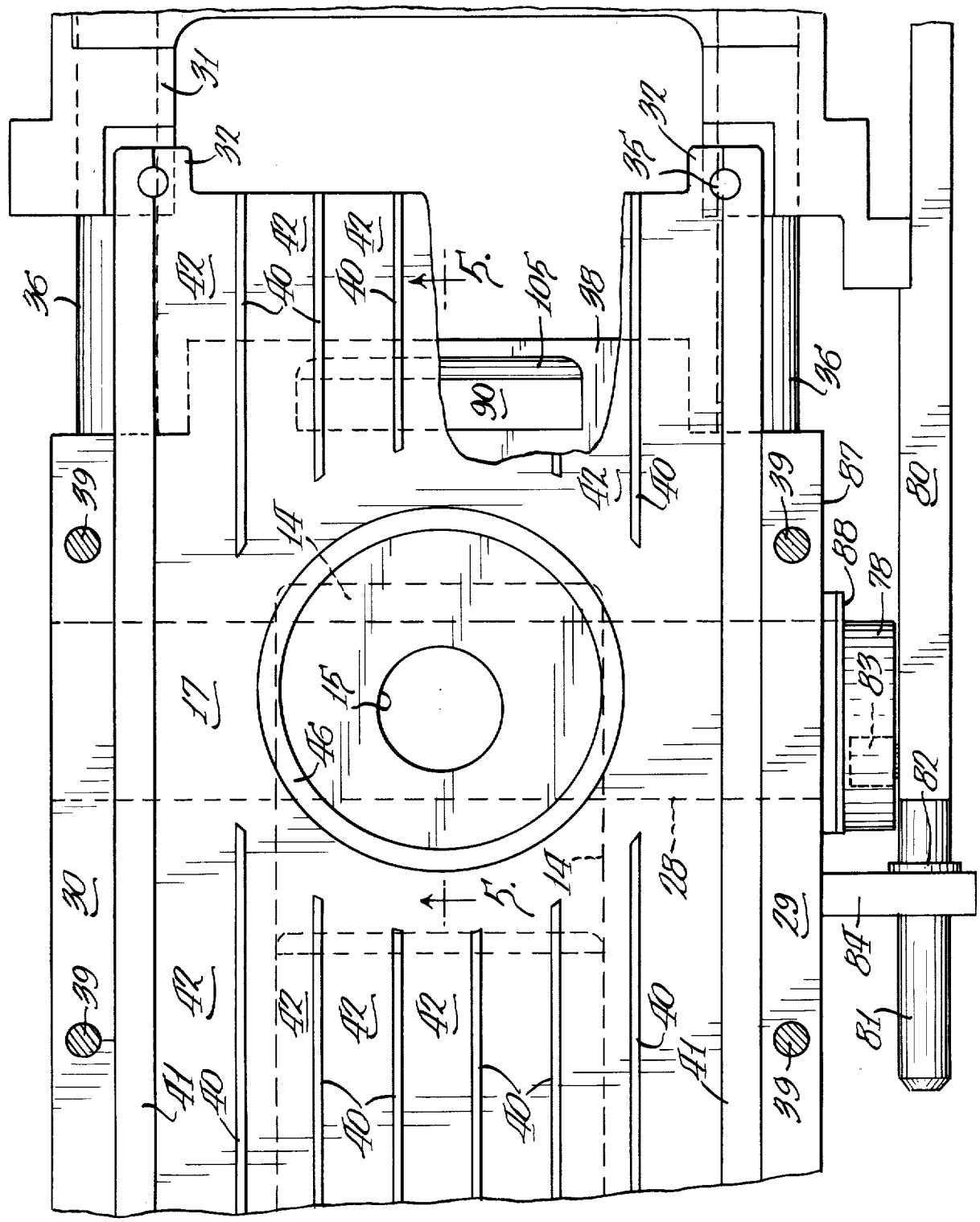

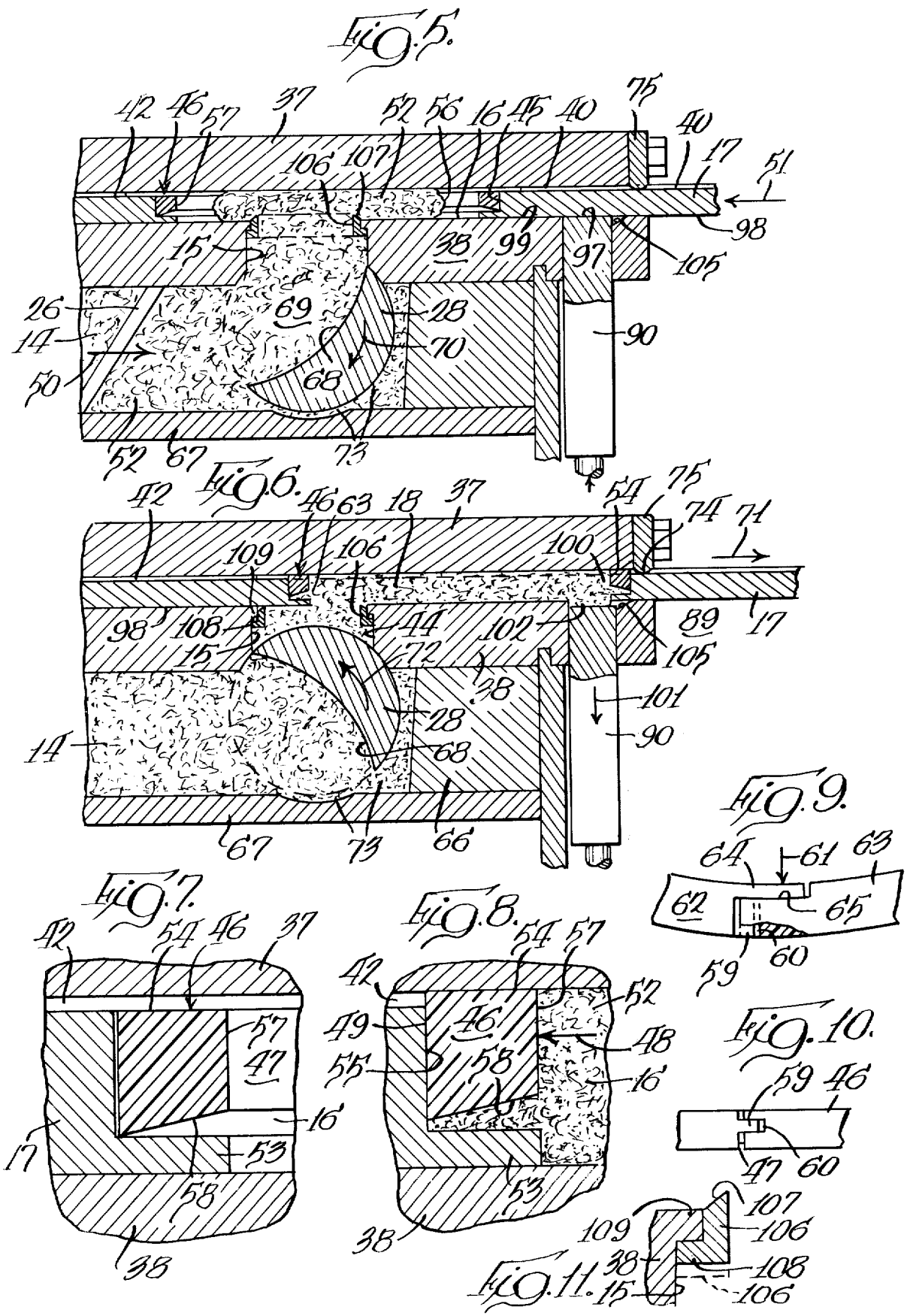

MOLDING APPARATUS

BACKGROUND OF THE INVENTION

This invention relates to an apparatus and method for shaping an article from moldable material in a mold opening in which the material is forced into the opening while the displaced air is vented in a free flow path from the opening to the exterior after which the air vent is closed and then the supply of material to the mold opening is terminated while maintaining molding pressure of the material. Then the opening is moved out of conjunction with the material supply with both valves remaining closed until the mold opening with the contained article has reached an article ejecting position.

With the apparatus and method of this invention the power requirements for charging the mold opening with the material being molded are greatly reduced because there is very little back pressure from the mold opening on the material entering the opening. Most of the back pressure in devices of this nature is caused by entrapped air which not only increases the power requirements in compressing this air but also results in extraneous air being trapped with the material within the opening. This not only increases greatly the power requirements to make a desirably shaped article but also often results in misshapen articles because of the entrapped air.

With the apparatus and method of this invention the mold is sealed to the supply passage for the material on the side of the mold opposite the air vent and seal so that there is substantially no loss of any liquid components from the pressurized material.

SUMMARY OF THE INVENTION

Although an air valve operating alone is disclosed in applicant's prior applications Ser. No. 436,192, filed Jan. 24, 1974 and now U.S. Pat. No. 3,869,757, and Ser. No. 444,299, filed Feb. 31, 1974, which disclose and claim air valves that are automatically closed when the air has been vented from the mold opening, applicant has discovered that greatly superior results are achieved both in lessened power requirements and in more perfectly shaped articles and especially in accommodating material of all consistencies which is important with food products if the air valves are used in conjunction with a material valve that can be closed when the mold opening is completely filled with material to maintain pressure on the material during the movement of the mold to an ejecting position. This is found to be particularly desirable with such food material as ground raw beef which can vary greatly in consistency and fluidity especially where the meat is mixed with a vegetable protein such as that derived from soy beans.

BRIEF DESCRIPTION OF THE DRAWINGS

FIG. 1 is a fragmentary view partially in section illustrating the pressure applying parts of a food material patty forming apparatus with which the illustrated embodiment of the invention is associated.

FIG. 2 is an enlarged fragmentary side elevational view of the right-hand portion of the apparatus of FIG. 1.

FIG. 3 is a view similar to FIG. 2 but illustrating the parts in mold projected and patty removal position.

FIG. 4 is a fragmentary horizontal sectional view partially broken away and partially in section taken substantially along line 4—4 of FIG. 2.

FIG. 5 is a fragmentary sectional view taken substantially along line 5—5 of FIG. 4.

FIG. 6 is a view similar to FIG. 5 but illustrating the parts of the apparatus when the material valve has been moved to closed position.

FIG. 7 is an enlarged fragmentary vertical sectional view illustrating one embodiment of the air valve in fully open position.

FIG. 8 is similar to FIG. 7 but illustrating the air valve in closed position.

FIG. 9 is a fragmentary plan view partially broken away of the air valve.

FIG. 10 is a fragmentary side elevational view of the air valve.

FIG. 11 is a fragmentary enlarged sectional view through the fill plate and a seal gasket at the mold filling opening.

DESCRIPTION OF THE PREFERRED EMBODIMENTS

The illustrated patty molding apparatus in the drawings and particularly at FIG. 1 is shown, described and claimed in applicant's prior U.S. Pat. No. 3,293,688, issued Dec. 27, 1966, with this patent and the prior applications referred to above, all included herein by reference, being assigned to the same assignee as is the present application. For the purpose of the present application only those parts of the apparatus are shown that will illustrate the setting of the invention of the present application.

The molding apparatus 10 comprises a feeder 11 to force the plastic material and particularly the food material such as ground raw meat 12 from a supply means such as a hopper 13 through a tunnel 14 that leads to an entrance or fill opening 15 to the mold opening 16 in a horizontally reciprocable flat mold plate 17 that is movable between a receiving position for the mold opening where the opening is filled with pressurized material 12 to a molded article 18 ejecting position illustrated by the broken lines of the mold plate 17 at the right end of FIG. 1. The article removal or knockout is conventional and is illustrated by the arrow 19.

Although in the illustrated embodiment there is disclosed only a single mold opening 16 in the mold plate 17 for producing a single molded article or ground meat patty 18 with each reciprocation of the mold plate the invention is equally applicable to multiple mold opening devices for forming a plurality of articles or patties at the same time with this type of a multiple article apparatus being illustrated by the apparatus of U.S. Pat. No. 3,747,160 assigned to the same assignee as the present application.

The feeder means 11 as is explained in detail in the first above patent is essentially a four motion feeder that comprises forwardly sloped spaced pins 20 mounted on a plate 21 and sloped forwardly toward the front of a supply passage tunnel 14 that extends from the bottom of the hopper 13 forwardly to the fill opening 15. At the front of the pin plate 21 there is provided a forwardly sloped feeder bar 26 that extends substantially completely across the generally horizontal and substantially rectangular tunnel passage 14.

In the first of the four motions the feeder means 11 is lowered from a position shown in FIG. 1 to a position beneath the hopper 13 with the upper ends of the pins 20 being retained in the horizontally reciprocable plate 22. This lowering is accomplished by dropping the lever 23 about its fulcrum 24 by engagement with a cam (not shown) operating on a cam follower 25.

Then, in the second of the four motions the feeder means 11 is retracted to the left as viewed in FIG. 1 with the lowered pins 20 and feeder bar 26 still in engagement with the horizontally reciprocable plate 22. In the third motion the feeder means 11 is raised substantially vertically in its retracted position to the left of that shown in FIG. 1 to reintroduce the feeder pins 20 and sloped bar 26 into the bottom of the hopper and rearwardly of the position shown with the feeder bar 26 being substantially at the entrance 27 to the tunnel 14. Then, the fourth motion moves the feeder 11 from the retracted position to the left of FIG. 1 forwardly horizontally to the position shown in FIG. 1 to force material 12 through the tunnel 14 and into the mold opening 16 by way of the fill opening 15 through an open material valve 28. The horizontal movement of the feeder 11 is caused by the reciprocating lever 34 engaging a depending bar 43 on the feeder 11.

As is explained in the above U.S. Pat. No. 3,293,688 the mold plate 17 is reciprocated between side mold plate guides 29 and 30 by being attached to a shuttle 31 to which the forwardly extending sides 32 of the mold plate 17 are releasably attached by the pins 35. This shuttle as explained in the last above patent slides on parallel horizontal rods 36 which can also carry a forwardly located paper feed that is not shown here as forming no part of the present invention but is shown and described in detail in U.S. Pat. No. 3,293,688. The mold plate 17 is reciprocated in its above described horizontal path by a motor, gear box and lever system which likewise is not shown here but is disclosed in detail in the patent immediately above and indicated here by the arrows 51 and 71.

The reciprocating movement of the mold plate 17 is not only guided between the side guides 29 and 30 but also between a top plate 37 and a bottom fill plate 38. This fill plate 38 contains the fill opening 15 and the whole assembly is bolted together as by side bolts 39.

As is shown in FIG. 4 the top of the mold plate is provided with spaced parallel and narrow ridges 40 and wider side ridges 41 that provide in space between them parallel air vent passages 42.

In the illustrated embodiment the mold opening 16 is generally circular to provide flat circular patties 18. At the circular periphery 45 there is provided an air valve ring 46 which is similar to the valve ring illustrated in the above-mentioned pending application Ser No. 444,299. The ring is split as shown at 47 in FIG. 10 so as to expand radially as indicated by the arrow 48 in FIG. 8 when subjected to the pressurized charge 52. This expanding of the ring in a manner similar to a piston ring presses the outer surface 49 of the ring against the inner surface 55 of that portion of the mold opening in which the ring 47 is located. In order to guide the ring 46 during this expansion to the position shown in FIG. 8 and during its contraction to the position of FIG. 7 there is provided a tongue 59 and groove 60 at the split end as is shown in detail in FIGS. 9 and 10.

This tongue and groove arrangements blocks leakage of fluid material upwardly at the split 47 as illustrated in FIG. 10. In order to provide a block against radial leakage in the direction 61 shown in FIG. 9 the two adjacent ends 62 and 63 of the split ring are provided with an overlapping flange on the inner circumference. This flange 64 is an inner peripheral extension of the ring end 62 and overlaps the end 63 by being snugly received within a correspondingly shaped recess 65.

When the plastic material 12 in the tunnel 14 is subjected to feeding pressure of the feeder bar 26 advancing as indicated by the arrow 50 in FIG. 5 while the mold plate 17 is being retracted as indicated by the arrow 51 the pressurized charge of material 52 in front of the advancing feeder bar 26 is forced up through the fill opening 15 by way of the open material valve 28 to fill the mold opening 16 as indicated by the expanding periphery 56 of the pressurized charge of moldable material that is within the mold opening.

In order to seal the fill opening or passage 15 to the bottom 98 of the mold plate 17 so as to prevent substantial fluid leakage on this side of the mold plate which is opposite to the side containing the air vent seal ring 46 there is provided a ring 106 in the fill opening 15 that has an inwardly and upwardly sloped top 107 and a bottom outwardly extending radial flange 108 that engages an undercut annular projection 109 on the top of the fill plate 38 to limit the extent of upward movement of the seal ring 106. The purpose of this, of course, is to prevent the seal ring 106 from being projected upwardly to too great an extent under the pressure of the pressurized material 52.

This seal ring 106 is preferably split in the manner similar to the ring 46 to allow for radial expansion into engagement with the entrance means opening 15 by the pressure of the charge 52 at the opening 15 during movement 71 of the mold toward ejecting position. The seal ring may or may not have the tongue and groove ends or the overlap seal flange shown with respect to the larger air vent ring.

As is illustrated in FIG. 8 when this pressurized charge 52 reaches the inner periphery 57 and the sloped bottom 58 of the solid ring part 47 it bears against and urges upwardly the air valve ring structure 46 to seal the parallel air vent passages 42 as by this time all of the extraneous air has been forced from the mold opening 16 by the entering pressurized charge 52 of moldable material. The entering charges 52 of pressurized material engages the bottom of the flange 108 forming a part of the inlet seal ring 106 and lifts it into projected position as shown in FIG. 5. Then as the mold plate 17 moves out in the direction 71 toward patty ejecting position the bottom 98 of the mold plate 17 engages the sloped top 107 of this small ring 106 and presses it back to retracted position as shown in FIG. 6. During all positions of the mold plate except where the mold opening is over the fill passage 15 the seal ring 106 is in retracted position and is therefore under pressure from the pressurized material 52 to urge it upwardly at all times and thereby block leakage of fluid components of the pressurized charge 52 between the fill opening 15 and the bottom of the mold plate 17. The result of this structure is not only is the air vented from the mold opening by the entering charge 52 of material as shown in FIG. 5 after which the air vent is sealed but also the bottom of the mold plate is sealed by the ring 106.

The material valve 28 previously mentioned is located at the fill opening 15 and at the front of the tunnel 14 which is occupied by a compression block 66 in which is located the tunnel passage 14. This compression block 66 is held between the forward end of a bottom plate 67 that defines the bottom of the tunnel 14 at the front end thereof and the fill plate 38.

The valve 28 which is rotatable about a central axis 79 is arranged horizontally and is of generally cylindrical shape. The cylindrical body of the valve is provided at one side with a material supply passage defined by a curved inner surface 68 so that when the valve is in the open position of FIG. 5 there is a smoothly curved arcuate passage 69 from the forward end of the supply tunnel 14 upwardly into the fill opening 15 and from there into the mold opening 16. The material in the tunnel 14 is under compression in front of the feeder bar 26 when the material valve 28 first begins to open with the mold cavity or opening approaching (FIG. 5) filling position. When the mold plate 17 is retracted 51 toward the fill position which the mold plate is approaching in FIGS. 2, 4 and 5, the valve 28 is rotated 70 into fill position. When the mold plate is fully retracted the circular mold opening 16 in this embodiment is concentric with the circular fill opening 15 for center filling. During this approach the incoming pressurized charge 52 begins to radiate outwardly to fill the mold opening 16 to form the patty 18 even before the openings 15 and 16 are completely centered. Then the mold plate 17 is moved (arrow 71) forwardly to the patty removal position shown in broken lines in FIG. 1.

The closing of the valve 28 not only closes the entrance 15 to the mold plate opening 16 (FIG. 6) but also retains the material in the patty 18 in tightly compressed form between the closed air valve 46 and the closed material valve 28. This insures that the compacting pressure on the patty will be maintained until the patty has been moved out of communication with the fill passage 15. This occurs, of course, as soon as the rear 63 of the patty is moved beyond the forward edge 44 of the fill opening 15.

As is shown in FIG. 6, when the air valve 46 is closed it is in raised position. It is then lowered or retracted (FIG. 5) preparatory to the next molding operation by engaging the bottom of a transverse cam or "comb" plate 75 having a generally rounded bottom 74 that bears against the top 54 of the air valve ring 47 to force it downwardly. This cam plate 75 contains bottom notches to accommodate the parallel ridges 40 in the top surface of the mold plate 17.

In order to rotate the material valve 28 between open and closed positions one end is provided with a cam plate 78 that is coaxial with the central axis 79 of the valve 28. This cam plate 78 is provided with a generally U-shaped but sloped cam passage 77 which opens to the right, or forwardly as shown in FIG. 3, when the valve 28 is in closed position.

Mounted on the shuttle 31 which slides on the parallel side rods 36 is a rearwardly extending arm 80 carrying on its rearward end a horizontal guide rod 81 that is engageable with a locating bearing 82. At the rearward end of the arm 80 adjacent the forward end of the guide rod 81 there is provided a circular cam follower 83 that enters the flared open end 86 of the curved cam passage 77 to rotate the cam 78 and thus the valve 28 to which it is attached from the closed position of FIG. 3 toward the open position of FIG. 2. Because the cam passage 77 must be in the receiving position shown in FIG. 3 for proper entry of the cam follower 83 the cam 78 can be provided with an automatic positioner device which may be of any customary type and which is not shown here for clarity of illustration of the essentials of the illustrated embodiment.

In order that the cam 78 and thus the valve 28 will only move when contacted by the cam follower 83 the side 87 of the apparatus is provided with a friction strip 88 that is frictionally engaged by the adjacent side of the cam 78.

Because the moldable material within the mold opening 16 is under considerable pressure when it is moved forwardly 71 to ejecting position and this pressure would tend to form a ridge of projected material or lip when the pressure was suddenly removed as by reaching the ambient 89, there is provided a pressure release piston 90 that is urged upwardly by a compression spring 91 in an adjustable retainer 92 that is mounted on a support bracket 95 that is attached to the bottom of the frame 96. The upper end 97 of this piston 90 is normally flush with the bottom 98 of the mold plate 17 and the top 99 of the fill plate 38. As the forward end 100 of the patty 18 passes over the top 97 of the vertically movable piston 90 the leading pressurized portion of the patty depresses 101 the piston to provide space for releasing this pressure of the patty material.

As the movement of the mold plate is continued as indicated at 71 this projecting lip 102 of patty material is pressed back into the bottom of the patty both by the spring 91 pressure on this projecting lip 102 and also by the forward sloped cavity 105 that is adjacent to the piston 90 as illustrated in FIG. 6. This means that the pressure release does not result in a misshapen or undesirably thick patty but one that is of uniform thickness throughout so as to stack readily in vertical stacks even with a large number of patties to a stack. Such a pressure release system is described and claimed in applicant's prior U.S. Pat. No. 3,479,687.

The operation of the illustrated embodiment of the apparatus is as follows. The mold plate 17 is moved by the mold plate drive including the shuttle as previously described to the retracted position of FIG. 1 where the fill opening 15 is aligned with the mold opening 16. Because of the interconnection as embodied in the arm 80 of the mold plate drive and the valve rotating cam follower 83 the retraction movement of the valve plate 17 from the fully extended patty 18 removal position shown in broken lines in FIG. 1 to the left as illustrated by the arrow 33 in FIG. 2 causes the cam follower 83 to enter the open end 86 of the cam passage 77 and rotate the cam clockwise as viewed in FIG. 2 and indicated at 70 to open the material valve 28 thereby providing upward flow of the pressurized charge 52 into the mold opening 16. In order to insure alignment of the cam follower 83 with the properly arranged entrance 86 to the cam passage 77 the bar 80 is provided with a projecting guide rod 81 having a tapered end 85 that enters the guide rod bearing 82 supported on the bearing mount as illustrated in FIG. 2.

With the valve 28 in open position as shown in FIG. 5 the pressurized charge 52 enters the mold opening by way of the passage 69 in the valve so that the expanding periphery 56 of the moldable material within the mold opening reaches the ring 47 of the air valve 46 and lifts it from the position of FIG. 7 to the position of FIG. 8 where the top surface 54 of the ring 47 effectively closes the air vents 42. The entering pressurized material expands outwardly as shown at 56 in FIG. 5 and when it contacts the inner periphery 57 of the ring it expands radially such as a piston ring is expanded with this radial movement being guided by the tongue 59 and groove 60. The radial forces 61 also press the sealing flange 64 in the cooperating recess 65 to provide a seal which in combination with the tongue and groove seal prevent substantially fluid leakage between the ring ends 62 and 63. At the same time the entering charge 52 lifts the fill passage seal ring 106 to its raised position as shown in FIG. 6 for sealing against the moving bottom 98 of the mold plate 17.

The mold plate is moved to the right as indicated at 71 to patty ejecting position for ejecting 19. This movement of the mold plate and particularly the drive shuttle 31 therefor causes the cam follower 83 to move to the right and rotate the cam in the counterclockwise direction 72 to close the fill opening 15. This retains the material in the patty 18 between the closed material valve 28 and the closed air vent valve 46 under pressure during removal of the patty from the apparatus. The forced movement 71 of the mold plate 17 causes the forward end or leading edge 100 of the patty 18 to pass over the top end of the pressure release piston 90. This pressure causes the piston 90 to retract against the urging of the spring 91 and then as the patty 18 continues its movement to the right the received excess of patty material 102 is returned to the patty as the patty continues to pass over the top end of the pressure release piston 90.

As the movement of the mold plate 17 to the right is continued the rounded bottom end 74 of the transverse cam bar 75 presses against the top surface 54 of the ring 47 to press the ring down to its retracted position where the top surface 54 is flush with the top of the mold plate 17 as shown in FIG. 7. Then after removal 19 of the patty 18 from the patty removal position the mold plate 17 is returned 51 preparatory to receiving another pressurized charge of material and forming another patty.

As is shown in FIGS. 7 and 8 the downward movement of the air vent closure ring 46 is limited by an underlying ledge 53 that forms a part of the mold plate 17 and thus prevents the air vent ring from dropping from the mold plate.

As can be seen in FIGS. 5 and 6, the rotary material valve 28 is surrounded on all lateral sides except for the side adjacent the fill opening 15 by a layer of the moldable material 73 which in this embodiment is ground raw meat. This arrangement provides that the material itself lubricates and equalizes the pressure around the rotary valve.

As can be noted, the material valve 28 opens after the air valve 46 is opened by the cam bar 47 and the material valve 28 closes after the air valve 46 is closed, With this arrangement there is no excess pressure applied to the moldable material 12 which is very important in connection with molding food products and especially ground raw meat. Excess pressure tends to expel meat juices and result in an overly compacted and tough meat patty with a much different texture from a tightly compressed patty such as those formed by hand. The apparatus and method of this invention result in patties that closely approximate the texture, flavor and tenderness of the hand made patties.

In addition, the invention permits the efficient and satisfactory molding of moldable materials of widely varying consistencies, such as ground raw meat from various sources and this meat mixed with varying amounts of additives such as vegetable proteins.

Having described my invention as related to the embodiments shown in the accompanying drawings, it is my intention that the invention be not limited by any of the details of description, unless otherwise specified, but rather be construed broadly within its spirit and scope as set out in the appended claims.

I claim:

1. Apparatus for pressure molding an article from moldable material, comprising: a mold having a mold opening for receiving a pressurized charge of said material; an entrance means to said mold opening for flow therethrough of said material; means for moving said mold for movement of said mold opening from the entrance means to a location for removing the shaped article and return to the entrance means; an air vent means from the mold opening for venting air displaced by the pressurized charge entering the mold opening; an air valve in said air vent means movable between open and closed positions; a moldable material valve in said entrance means mounted for movement between entrance means opening and closing positions; means for opening said material valve for passage of said pressurized charge of material into the mold opening; means for closing said air valve when said mold opening is substantially filled with said moldable material and prior to said moving of said mold opening from said entrance means; and means for closing said material valve also when said mold opening is substantially filled with said pressurized charge and prior to said moving of said mold opening from said entrance means, the material in said mold opening thereby being held under pressure between the closed air valve and the closed material valve.

2. The apparatus of claim 1 wherein said air vent means comprises a plurality of air passages leading from said mold opening along a boundary surface of the mold to the exterior of the apparatus.

3. The apparatus of claim 1 wherein there is provided a normally retracted but movable material seal ring at said entrance means extending substantially therearound and movable into sealing engagement with said mold and held in said sealing engagement by the pressure of said charge during said moving of said mold and means for mounting said material seal ring for said movement thereof.

4. The apparatus of claim 3 wherein said material seal is split to provide for essentially radial expansion into secure engagement with said entrance means when subjected to said pressurized charge.

5. The apparatus of claim 1 wherein said mold comprises a movable mold plate and top and bottom cover plates between which said mold plate is movably retained, said mold opening extending through the mold plate and said air vent means comprises passage means in the mold plate itself adjacent to at least one of said cover plates for passage of vented air therethrough.

6. The apparatus of claim 3 where there are provided means for rotatably mounting said material valve for rotation between open and closed positions, and said means for opening the material valve and the means for closing said material valve are operatively associated with said means for moving the mold.

7. The apparatus of claim 1 wherein there are provided means for rotatably mounting said material valve for rotation between open and closed positions, and said means for opening and closing said material valve comprises a cam associated with said valve for rotation thereof between open and closed positions and a cam follower mounted on said mold moving means and engaging said cam.

8. The apparatus of claim 7 wherein said air valve comprises a ring extending around and within the mold opening and having a split end provided with an extending tongue on one side and engaging a corresponding groove in the other said end.

9. The apparatus of claim 8 wherein one of said ring ends includes an extending flange on the inner periphery of the ring overlapping and located in a recess in the inner periphery in the other end of the ring to provide therewith a seal for the material during its expansion outwardly in a radial direction.

10. Apparatus for pressure molding an article from moldable material, comprising: a mold having a mold opening for receiving a pressurized charge of said material; an entrance means to said mold opening for flow therethrough of said material; an air vent means from the mold opening for venting air displaced by the pressurized charge entering the mold opening; an air valve in said air vent means movable between open and closed positions; a moldable material valve in said entrance means mounted for movement between entrance means opening and closing positions; means for opening said material valve for passage of said pressurized charge of material into the mold opening; means for closing said air valve when said mold opening is substantially filled with said moldable material; and means for closing said material valve when said mold opening is substantially filled with said pressurized charge, the material in said mold opening thereby being held under pressure between the closed air valve and the closed material valve, said air valve comprising a substantially rigid valve member located within the mold opening and means for mounting said valve for movement relative to the mold into air vent closing position with said air vent extending from the mold opening to be blocked by the rigid valve.

11. The apparatus of claim 10 wherein said rigid valve member comprises a split ring extending around and within the periphery of the mold opening.

12. The method of shaping an article from moldable material, comprising: providing a mold having an article shaping opening therein, an entrance for pressurized moldable material to said opening and an air vent from said mold opening; supplying a pressurized charge of said moldable material through said entrance into said mold opening thereby forcing extraneous air from said opening through said air vent; closing said air vent after said mold opening is filled with said pressurized charge to prevent substantial leakage of material through said air vent; and then terminating flow of said material through said entrance while said mold opening is in communication with said entrance for maintaining pressure on the material within the mold opening prior to moving said mold opening from said entrance.

13. The method of shaping an article in a mold opening of a movable mold from pressurized moldable material, comprising: providing a mold having an article shaping opening therein and a filling opening for the pressurized moldable material adjacent to the mold opening during the filling; injecting pressurized moldable material through said opening into the mold opening and venting extraneous air from the mold opening that is displaced by the entering pressurized material in order to lessen the power requirements for flowing the pressurized material into the mold opening; closing the air vent from the mold opening as soon as the opening is filled with moldable material with resulting completion of the venting of air; closing the filling opening after said closing of said air vent and thereby maintaining pressure on the moldable material that is trapped within the mold opening between the closed air vent and the closed pressurized material supply; thereafter moving the mold to remove the mold opening and the resulting molded article therein away from communication with the filling opening; and pressure sealing said filling opening to said mold during movement of said mold.

14. Apparatus for pressure molding an article from moldable material, comprising: a mold having a mold opening for receiving a pressurized charge of said material; an entrance means to said mold opening for flow therethrough of said material; means for moving said mold for movement of said mold opening from the entrance means to a location for removing the shaped article and return to the entrance means; an air vent means from the mold opening for venting air displaced by the pressurized charge entering the mold opening; an air valve in said air vent means movable between open and closed positions; means for closing said air valve when said mold opening is substantially filled with said moldable material and prior to said moving of said mold opening from said entrance means; a normally retracted but movable material seal ring at said entrance means extending substantially therearound and movable into sealing engagement with said mold and held in said sealing engagement by the pressure of said charge during said moving of said mold; and means for mounting said material seal ring for said movement thereof.

15. The apparatus of claim 14 wherein said material seal is split to provide for essentially radial expansion into secure engagement with said entrance means when subjected to said pressurized charge.

* * * * *